(12) United States Patent
Tang et al.

(10) Patent No.: US 8,569,917 B2
(45) Date of Patent: Oct. 29, 2013

(54) MOTOR DRIVE DEVICE

(75) Inventors: Xian Tang, Shenzhen (CN); Wei Xing Mao, Rochester Hills, MI (US); Bin Wei Li, Shenzhen (CN)

(73) Assignee: Johnson Electric S.A., Murten (CH)

( * ) Notice: Subject to any disclaimer, the term of this patent is extended or adjusted under 35 U.S.C. 154(b) by 278 days.

(21) Appl. No.: 12/909,659

(22) Filed: Oct. 21, 2010

(65) Prior Publication Data

US 2011/0089789 A1  Apr. 21, 2011

(30) Foreign Application Priority Data

Oct. 21, 2009 (CN) .......................... 2009 1 0110316

(51) Int. Cl.
- *H02K 5/22* (2006.01)
- *H02K 23/66* (2006.01)
- *H02K 7/116* (2006.01)
- *H02K 11/00* (2006.01)
- *E05F 15/10* (2006.01)

(52) U.S. Cl.
USPC ............ 310/75 R; 310/71; 310/83; 310/68 B; 439/76.1

(58) Field of Classification Search
CPC ....................................................... H01R 12/72
USPC .................................. 310/71, 75 R; 439/76.1
See application file for complete search history.

(56) References Cited

U.S. PATENT DOCUMENTS

| | | | |
|---|---|---|---|
| 3,899,234 A * | 8/1975 | Yeager et al. ................. | 439/267 |
| 6,201,326 B1 * | 3/2001 | Klappenbach et al. ...... | 310/75 R |
| 6,320,340 B1 | 11/2001 | Hils et al. | |
| 6,652,315 B2 * | 11/2003 | Licka ............................ | 439/567 |
| 6,710,484 B2 * | 3/2004 | Kitoh et al. ..................... | 310/83 |
| 6,756,711 B2 | 6/2004 | Matsuyama et al. | |
| 6,759,783 B2 | 7/2004 | Hager et al. | |
| 6,924,573 B2 * | 8/2005 | Kitoh et al. ..................... | 310/89 |
| 6,943,472 B2 * | 9/2005 | Buss et al. ..................... | 310/98 |
| 7,138,736 B2 * | 11/2006 | Yamamoto et al. ............ | 310/71 |
| 7,141,904 B2 | 11/2006 | Mirescu | |
| 7,602,090 B2 * | 10/2009 | Huck et al. ..................... | 310/71 |
| 7,652,403 B2 * | 1/2010 | Sakata ............................ | 310/71 |
| 7,859,148 B2 * | 12/2010 | Mizutani ........................ | 310/71 |
| 2006/0035491 A1 | 2/2006 | Robin et al. | |
| 2009/0121578 A1 * | 5/2009 | Benkert ........................ | 310/239 |
| 2010/0101889 A1 * | 4/2010 | Yamaguchi et al. .......... | 180/444 |
| 2011/0156545 A1 * | 6/2011 | Wen et al. ..................... | 310/68 B |

FOREIGN PATENT DOCUMENTS

EP 1057241 B1 2/2008

* cited by examiner

*Primary Examiner* — Burton Mullins
(74) *Attorney, Agent, or Firm* — Muncy, Geissler, Olds & Lowe, PLLC

(57) ABSTRACT

A motor drive device comprises a motor, a gearbox mounted to the motor and a control module. The gearbox comprises a gearbox housing that has an opening facing the motor. The motor has a shaft that extends into the gearbox housing through the opening to drive a worm gear of the gearbox. The control module has a PCB mounted to the gearbox and most of the PCB is accommodated in the opening of the gearbox housing. The PCB extends in a plane substantially parallel to the shaft.

13 Claims, 4 Drawing Sheets

MOTOR DRIVE DEVICE

CROSS REFERENCE TO RELATED APPLICATIONS

This non-provisional patent application claims priority under 35 U.S.C. §119(a) from Patent Application No. 200910110316.5 filed in The People's Republic of China on Oct. 21, 2009.

FIELD OF THE INVENTION

This invention relates to a motor drive device comprising a motor and a gearbox, and in particular to a motor drive device having a built-in control module.

BACKGROUND OF THE INVENTION

FIG. 1 illustrates a prior art motor drive device, which comprises a motor 10', a gearbox 20' mounted to the motor 10' and a control module 30' mounted to the gearbox 20'. The control module 30' comprises an L-shaped PCB 31' formed by a first portion and a second portion. The first portion is located alongside the motor 10' and extends parallel to the motor shaft and the second portion is arranged inside the gearbox 20' and extends perpendicular to the motor shaft. An inner L-shaped connector 33' is fixed to the PCB where the first portion and the second portion join together to feed current from the PCB to motor terminals. The control module 30' increases the size of the motor drive device and the additional L-shaped connector increases the cost of the motor drive device.

Hence there is a desire for an improved motor drive device which mitigates the above problems.

SUMMARY OF THE INVENTION

Accordingly, in one aspect thereof, the present invention provides a motor drive device comprising a motor, a gearbox mounted to the motor and a control module; the gearbox comprising a gearbox housing that has an opening facing the motor; the motor comprising a shaft that extends into the gearbox housing through the opening to drive a worm gear of the gearbox; wherein the control module comprising a PCB mounted to the gearbox and most of the PCB is accommodated in the opening, the PCB extending in a plane substantially parallel to the shaft.

Preferably, solid contacts are formed on the PCB and electrically connected with resilient motor terminals which grip the PCB.

Preferably, the control module comprises a position magnet mounted to the shaft, and Hall sensors mounted to the PCB for detecting rotation of the shaft.

Preferably, the PCB is substantially rectangular.

Preferably, one edge of the PCB has at least one step and has a variable width caused by the at least one step, and the Hall sensors are mounted to the PCB at a portion corresponding to a smaller width.

Preferably, an axially extending groove is formed in each of two opposite sidewalls of the opening, and the PCB is mounted to the gearbox housing by way of the grooves.

Preferably, the PCB is a press fit in the grooves.

Preferably, the control module comprises a case mounted to the opening of gearbox housing and the PCB is held to the gearbox housing by the case.

Preferably, the case comprises a first portion sandwiched between the motor housing and the gearbox housing, and an integrally formed second portion that is located at one side of the motor housing for receiving terminals of the PCB.

Preferably, the worm gear and the terminals are located at one side of a plane that contains the shaft and is parallel to an axis of rotation of the worm gear.

Preferably, the case and the gearbox housing are locked by a locking mechanism formed by a tooth formed on one of the gearbox housing and the case and a hole formed in a resilient finger formed on at the other one of the gearbox housing and the case.

Preferably, a seal member is disposed in the interface between the gearbox housing and the case.

Preferably, a resilient washer is disposed in the interface between the motor housing and case.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
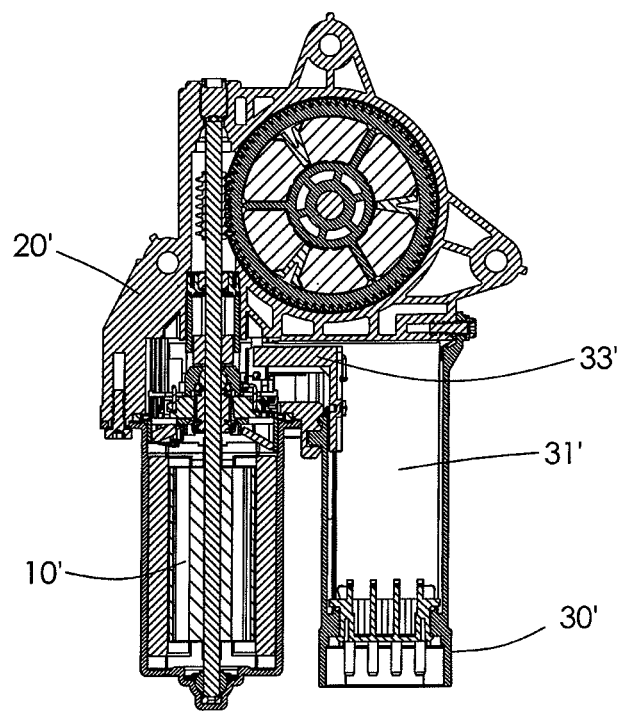
FIG. 1 illustrates a prior art motor drive device.
Figure 2:
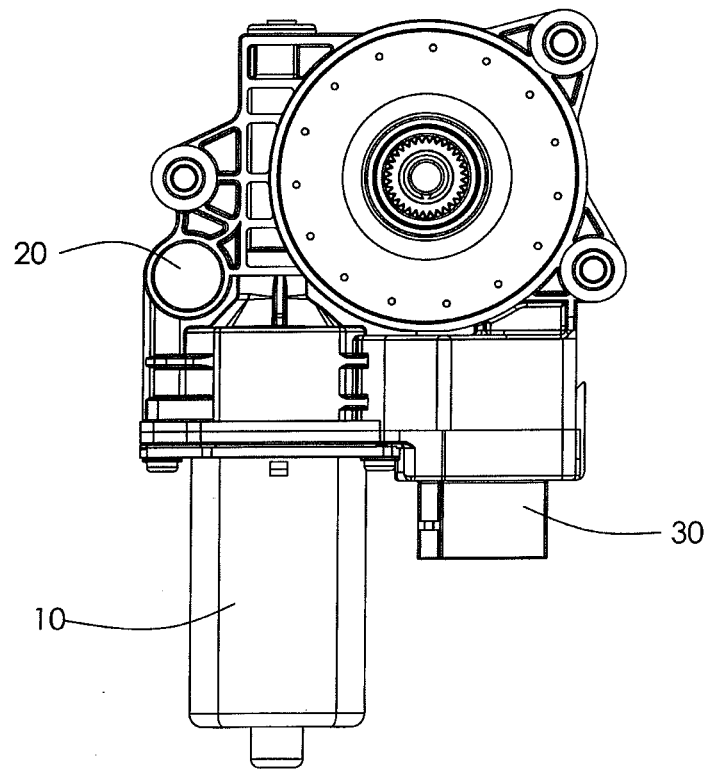
FIG. 2 illustrates a motor drive device in accordance with a preferred embodiment of the present invention.
Figure 3:
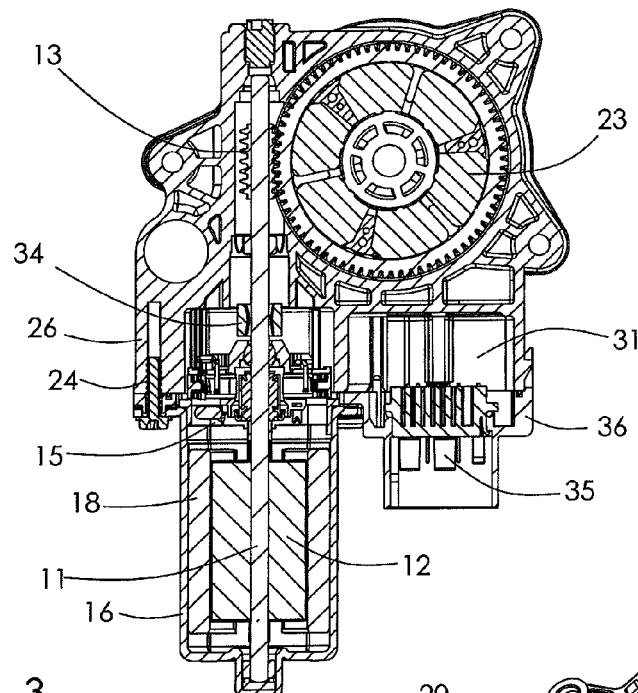
FIG. 3 illustrates a cross section of the motor drive device of FIG. 2.

A motor drive device according to the preferred embodiment is illustrated in FIGS. 2 to 7. The motor drive device is preferably used in a window lift mechanism for raising or lowering window panes in a motor vehicle. The motor drive device comprises a motor 10, a gearbox 20 mounted to the motor 10 and a control module 30 mounted to the gearbox 20. The motor 10 is a permanent magnet direct current (PMDC) motor comprising a stator and a rotor rotatably mounted to the stator. The stator comprises a housing 16 having an open end, permanent magnets 18 fixed to an inner surface of the housing 16 and an end cap 15 mounted to the open end of the housing 16. The rotor comprises a shaft 11, a rotor core 12 fixed onto the shaft 11, rotor windings wound about teeth of the rotor core, a commutator fixed onto the shaft 11 next to the rotor core 12 and a worm 13 on a distal portion of the shaft 11 received by the gearbox 20. The shaft is rotatably supported by bearings mounted on the stator. Brushes are supported by the end cap 15 and make sliding contact with the commutator for transferring electrical energy to the rotor.

The gearbox 20 comprises a gearbox housing 26 having an opening confronting the motor and a worm gear 23 held by the gearbox housing 26. The distal portion of the motor shaft 11 extends into the gearbox housing 26 through the opening to drive the worm gear 23 via the worm. The worm gear 23 has an output shaft which rotates about an axis substantially perpendicular to the shaft 11.

The control module 30 comprises a printed circuit board (PCB) 31, Hall sensors 32 mounted on the PCB 31, a connector comprising terminals 35 mounted to the PCB 31 and an insulating terminal base 33 for holding the terminals 35, a case 36 for holding the connector, and a position magnet 34 fixed to the shaft 11 for rotation therewith. The position magnet 34 is a ring-shaped permanent magnet mounted to the shaft 11 between the end cap 15 and the worm 13. The Hall sensors 32 are disposed near the position magnet 34 to detect the rotation of the position magnet 34 and thus the rotation of the shaft 11. The connector is used for transferring electrical power and signals such as the signals from the Hall sensors. The PCB 31 is mounted to the opening of the gearbox housing 26 and is partly or entirely received by the gearbox housing 26. The PCB 31 lies substantially parallel to the motor shaft 11 and perpendicular to the axis of the output shaft of the worm gear 23. Preferably, the PCB 31 is rectangular or slightly L-shaped, its longer edge extending perpendicular to the shaft 11 and its shorter edge extending parallel to the shaft 11.

Figure 4:
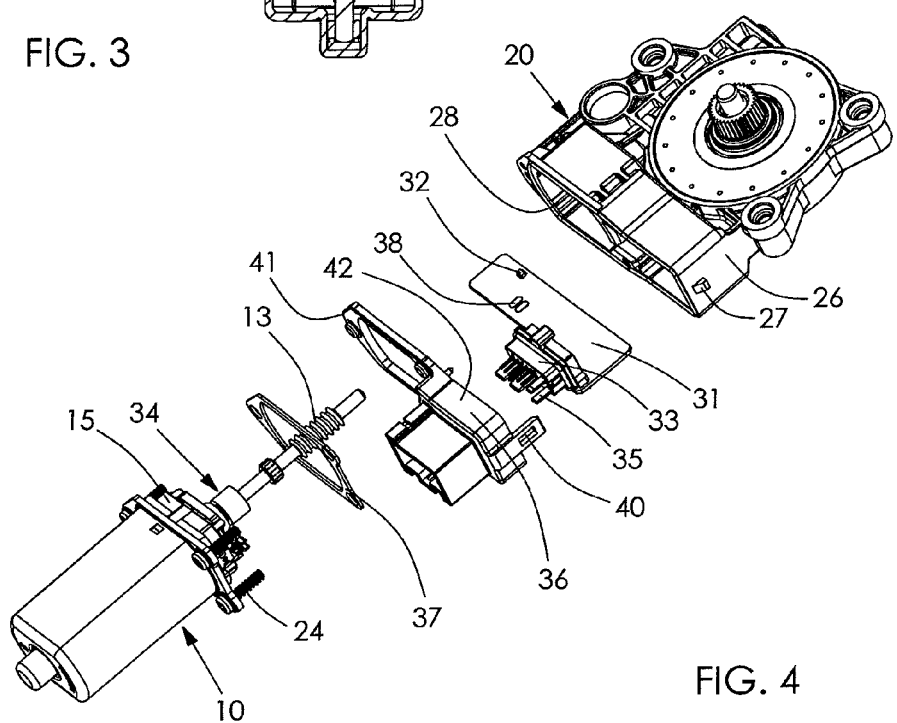
FIG. 4 and FIG. 5 are exploded views of the motor drive device of FIG. 2.
Figure 6:
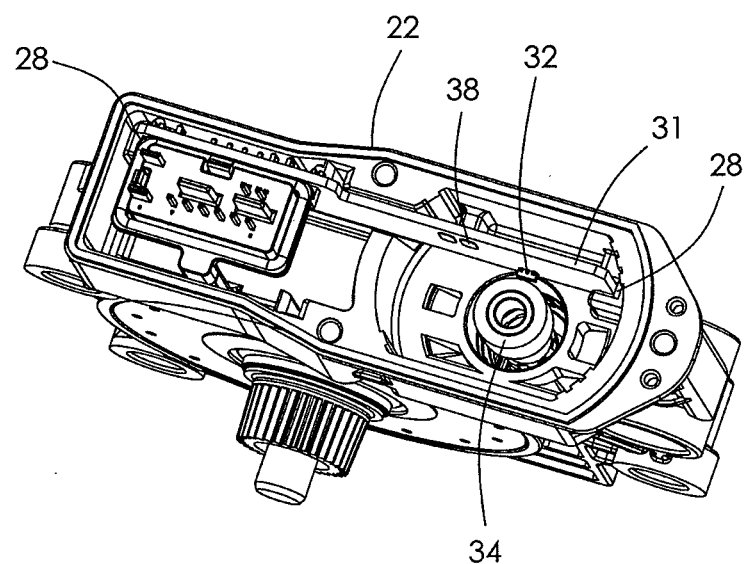
FIG. 6 illustrates a gearbox and a PCB of the motor drive device.

Referring to FIG. 4 and FIG. 6, the gearbox housing 26 comprises a pair of grooves 28 formed in the inner surface of two opposite side walls of the opening. The grooves 28 extend in a direction parallel to the motor shaft 11. The PCB 31 is inserted into the gearbox housing 23 with two opposite edges received and guided by the grooves 28 respectively. Preferably, the PCB 31 is a slight press-fit within the grooves 28. As is shown in FIG. 4, the Hall sensors 32 are arranged on the left half portion of the PCB 31 which is near to the shaft 11, and the connector is arranged at the right half portion of the PCB 31. Preferably, the free ends of the terminals 35 of the connector extend parallel to the PCB 31.

Figure 5:
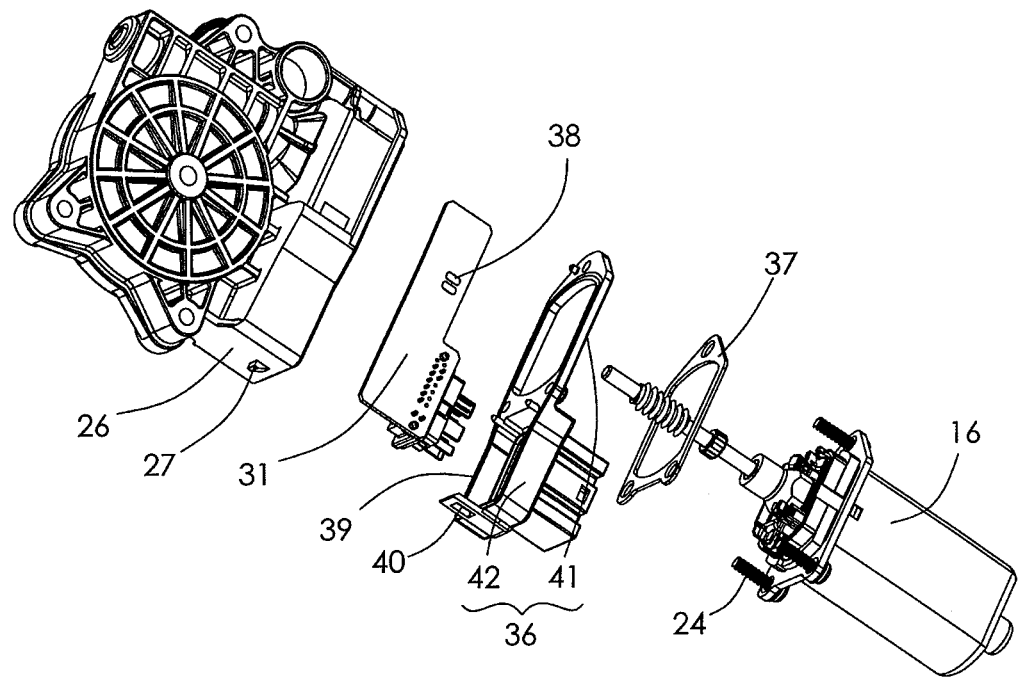

The case 36 of the control module 30 is mounted to the opening of the gearbox housing 26. The PCB 31 is held by the case 36 and the gearbox housing 26. As is shown in FIG. 4 and FIG. 5, the case 36 comprises a first portion 41 kept between the stator housing 16 and the gearbox housing 26 and a second portion 42 adjoining the first portion 41 and lying beside the stator housing 16. In this embodiment, the stator housing 16 and gearbox housing 26 are fixed together by screws 24. The second portion 42 is cylindrical for receiving the connector of PCB 31. The case 36 has a resilient tongue with a hole 40, while the gearbox housing 26 has a corresponding tooth 27 for engaging the hole 40, to clip the case 36 to the gearbox housing 26 during assembly. The case 36 is temporarily mounted to the gearbox housing 26 by the engagement of the hole 40 and tooth 27. Alternatively, the tooth can be formed on the case 36 and the hole can be formed in a finger extending from the gearbox housing 26.

Seal member 39, such as a rubber O-ring seal, is disposed between the case 36 and the gearbox housing 26 to resist the ingress of water through this connection. A rubber washer 37 is disposed between the case 36 and the stator housing 16 to resist the ingress of water through this connection so as to make the motor drive device waterproof.

A pair of solid contacts 38 is provided on the PCB 31. The contacts 38 are flat and are pressed by resilient motor terminals 44 (See FIG. 7) to establish an electrical connection. The flat contacts 38 are significant smaller than traditional inner connectors such as those shown in FIG. 1 so that the motor drive device is more compact. Furthermore, as is shown in FIG. 6, most of the PCB 31 is received by the gearbox housing 26. The dimension of the PCB 31 measured in the shaft 11 direction is less than half of the length of the shaft 11.

In the embodiment shown, the worm gear 23 and the PCB connector are located at one side of a plane that contains the shaft 11 and is parallel to the output shaft of the worm gear 23.

In the embodiment, the PCB 31 has one step and is L-shaped. However, the PCB 31 can have more than one step or no steps.

Figure 7:
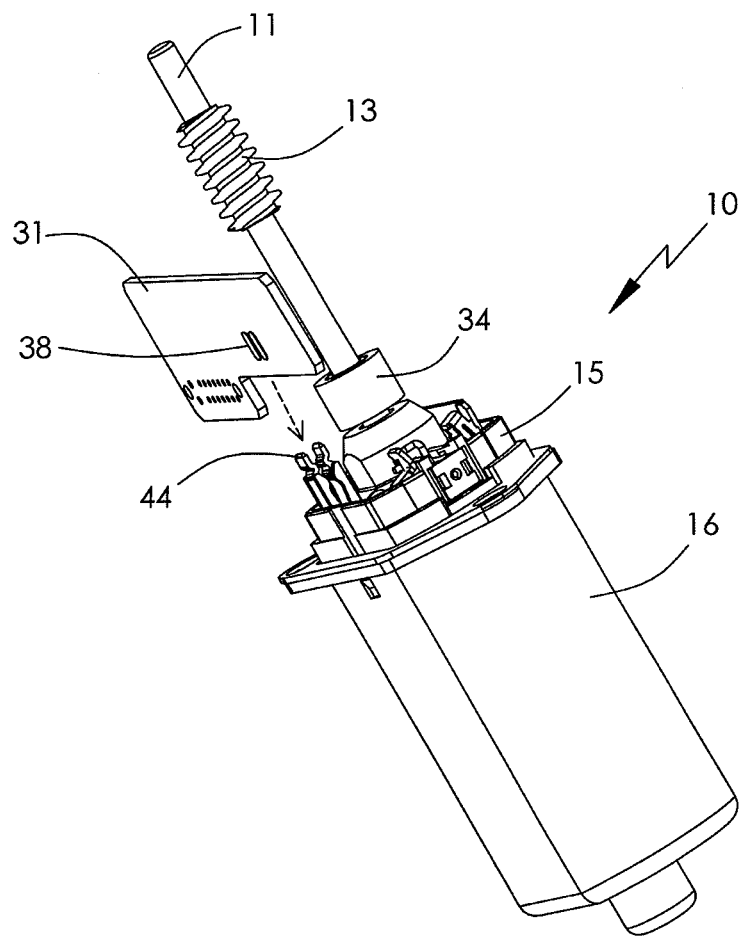
FIG. 7 a motor and PCB of the motor drive device of FIG. 2.

FIG. 7 illustrates the motor 10 showing the motor housing 16 with its open end closed by the end cap 15 and the distal portion of the shaft 11 extending through the end cap and supporting the worm 13 and the position magnet 34. Also shown is the PCB 31 with the solid contacts 38 about to be moved in the direction of the dashed arrow to schematically illustrate how the motor terminals 44 engage the solid contacts 38 as the PCB is inserted between the motor terminals 44.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, the position magnet 34 can be a piece of magnet rather than a ring magnet or several pieces of magnet arranged in a ring. The case 36 and the end cap 15 may be made as one piece, eliminating the need for the rubber washer 37. While the term rubber has been used to describe the rubber washer and the o-ring seal, rubber may be replaced by other suitable materials such as synthetic rubber, silicone rubber and other elastomeric materials.

The invention claimed is:

1. A motor drive device comprising a motor, a gearbox mounted to the motor and a control module;
   the gearbox comprising a gearbox housing that has an opening facing the motor;
   the motor comprising a motor housing, and a shaft that extends into the gearbox housing through the opening to drive a worm gear of the gearbox;
   wherein the control module comprises a separate case mounted to the opening of the gearbox housing, a PCB mounted to the gearbox and most of the PCB is accommodated in the opening, the PCB extending in a plane substantially parallel to the shaft; and
   wherein solid contacts are formed on the PCB and electrically connected with resilient motor terminals which grip the PCB.

2. The motor drive device of claim 1, wherein the control module comprises a position magnet mounted to the shaft, and Hall sensors mounted to the PCB for detecting rotation of the shaft.

3. The motor drive device of claim 1, wherein the PCB is substantially rectangular.

4. The motor drive device of claim 1, wherein one edge of the PCB has at least one step and has a variable width caused by the at least one step, and the Hall sensors are mounted to the PCB at a portion corresponding to a smaller width.

5. The motor drive device of claim 1, wherein an axially extending groove is formed in each of two opposite sidewalls of the opening, and the PCB is mounted to the gearbox housing by way of the grooves.

6. The motor drive device of claim 5, wherein the PCB is a press fit in the grooves.

7. The motor drive device of claim 5, wherein the PCB is held to the gearbox housing by the case.

8. The motor drive device of claim 7, wherein the case comprises a first portion sandwiched between the motor housing and the gearbox housing, and an integrally formed second portion that is located at one side of the motor housing for receiving terminals of the PCB.

9. The motor drive device of claim 8, wherein the worm gear and the terminals are located at one side of a plane that contains the shaft and is parallel to an axis of rotation of the worm gear.

10. The motor drive device of claim 7, wherein the case and the gearbox housing are locked by a locking mechanism formed by a tooth formed on one of the gearbox housing and the case and a hole formed in a resilient finger formed on the other one of the gearbox housing and the case.

11. The motor drive device of claim 7, wherein a seal member is disposed in the interface between the gearbox housing and the case.

12. The motor drive device of claim 11, wherein a resilient washer is disposed in the interface between the motor housing and case.

13. The motor drive device of claim 1, wherein the motor is a direct current motor having a permanent magnet stator and a wound rotor, the shaft has a worm which engages the worm gear and a position magnet in the form of a single piece ring shaped permanent magnet;

wherein the worm gear has an output shaft having an axis which extends in a direction perpendicular to the shaft of the motor, the worm gear being rotatable about the axis of the output shaft;

wherein the control module has a case which is located between and sealed to the motor housing and the gearbox housing, the case supporting the PCB and a connector connected to the PCB for connecting to power lines and signal lines, the PCB also being fixed to the gearbox housing by way of grooves in which the PCB is slid as a press fit and held in the grooves by the case; and wherein the motor has motor terminals which are resiliently separated by the insertion of the PCB between them as the motor, control module and gearbox are assembled together, the motor terminals gripping the PCB through contact pads on the PCB in the form of solid contacts, to make electrical connections with the PCB.

* * * * *